(12) United States Patent
Hempker et al.

(10) Patent No.: US 7,137,161 B2
(45) Date of Patent: Nov. 21, 2006

(54) APPARATUS AND METHOD FOR RELOCATING A MEDICAL EXAMINATION TABLE

(75) Inventors: James Christopher Hempker, Troy, OH (US); Joseph P. Schlater, Versailles, OH (US)

(73) Assignee: Midmark Corporation, Versailles, OH (US)

( * ) Notice: Subject to any disclaimer, the term of this patent is extended or adjusted under 35 U.S.C. 154(b) by 140 days.

(21) Appl. No.: 11/066,355

(22) Filed: Feb. 25, 2005

(65) Prior Publication Data

US 2006/0191072 A1 Aug. 31, 2006

(51) Int. Cl.
*A61G 7/08* (2006.01)
*A61G 5/00* (2006.01)

(52) U.S. Cl. .................. 5/611; 5/86.1; 5/600

(58) Field of Classification Search .......... 5/600, 5/611, 613, 616, 86.1; 280/47.34, 79.3, 79.11; 414/458

See application file for complete search history.

(56) References Cited

U.S. PATENT DOCUMENTS

| | | | |
|---|---|---|---|
| 2,508,661 A | 5/1950 | Campbell | |
| 2,739,785 A * | 3/1956 | Gray | 5/510 |
| 3,286,986 A | 11/1966 | Blankenship | |
| 3,362,704 A * | 1/1968 | Pilz | 5/618 |
| 3,547,288 A | 12/1970 | Butler | 214/372 |
| 3,807,750 A | 4/1974 | Brown | 280/35 |
| 4,101,120 A * | 7/1978 | Seshima | 5/616 |
| 4,155,471 A | 5/1979 | Yancy | 414/420 |
| 4,718,813 A | 1/1988 | Kehlenbach | 414/684 |
| 5,123,797 A * | 6/1992 | Schnelle et al. | 414/401 |
| 5,257,425 A | 11/1993 | Shinabarger | 5/81.1 |
| 5,279,011 A * | 1/1994 | Schnelle | 5/616 |
| 5,362,194 A | 11/1994 | Kassebaum | 414/427 |
| 5,477,570 A * | 12/1995 | Hannant et al. | 5/86.1 |
| 5,621,932 A * | 4/1997 | Strachan | 5/600 |
| 5,639,197 A | 6/1997 | Cummins et al. | 414/21 |
| 5,651,150 A * | 7/1997 | Kanitzer et al. | 5/600 |
| 5,655,734 A | 8/1997 | Dahl | 244/137.1 |
| 5,660,518 A | 8/1997 | Meier | 414/458 |
| 5,678,973 A | 10/1997 | Cox | 414/341 |
| 6,079,931 A | 6/2000 | English, Jr. et al. | 414/458 |

(Continued)

FOREIGN PATENT DOCUMENTS

EP 0269732 8/1988

(Continued)

OTHER PUBLICATIONS

Marketing Brochure, *Power Table Demonstration Van Loading and Transport*, The Brewer Company, dated Jul. 10, 2004.

(Continued)

*Primary Examiner*—Michael Trettel
(74) *Attorney, Agent, or Firm*—Wood, Herron & Evans, LLP

(57) ABSTRACT

A transportation cart for relocating a medical examination chair or table comprises a chassis having an open end that defines a receiving area for positioning a base of a medical examination table therebetween. A table support member extends upwardly from the chassis to engage structural portions of the examination table, such that the table may be supported thereon when the table is lowered to rest on the table support member. With the weight of the table supported by the cart, the base may be further actuated so that it is raised from the floor. Thereafter, the transportation cart may be maneuvered to relocate the table as desired. To place the table at the new location, the base is lowered to engage the floor and raise the table from the cart.

14 Claims, 4 Drawing Sheets

U.S. PATENT DOCUMENTS

| | | |
|---|---|---|
| 6,186,728 B1 | 2/2001 | Michaud ..................... 414/458 |
| 6,460,950 B1 | 10/2002 | Spitzer et al. ........... 312/249.8 |
| 6,634,658 B1 | 10/2003 | Larouche ................... 280/47.2 |
| 6,659,706 B1 | 12/2003 | English, Jr. et al. ........ 414/458 |
| 6,715,979 B1 | 4/2004 | Theising et al. ............ 414/458 |
| 2001/0041128 A1 | 11/2001 | Womble et al. |
| 2002/0071751 A1 | 6/2002 | Brice et al. |

FOREIGN PATENT DOCUMENTS

| | | |
|---|---|---|
| JP | 6056396 | 3/1994 |

OTHER PUBLICATIONS

English Abstract for Japanese Patent No. JP6056396.

* cited by examiner

US 7,137,161 B2

APPARATUS AND METHOD FOR RELOCATING A MEDICAL EXAMINATION TABLE

FIELD OF THE INVENTION

The present invention relates generally to medical examination tables, and more particularly to a transportation cart that is configured to facilitate relocating a medical examination table.

BACKGROUND OF THE INVENTION

Articulating medical examination tables and chairs are known in the art for supporting patients thereon, and for placing patients in various positions that facilitate examination and/or the performance of various medical procedures. For simplicity, these devices will be referred to herein as "tables," it being understood that the invention relates to both medical examination tables and chairs.

Conventional examination tables typically include a seat section and a back section supported on a base unit. The seat and back sections are moveable relative to one another and relative to the base to place a patient in a desired position. The seat section or back section may be articulated by actuating mechanisms such as motors, pneumatic or hydraulic cylinders, or other devices to move the seat and back sections between the various positions, and to adjust the height of the seat and back sections relative to the base. Most tables, for example, have a back section that is maneuverable from a first, inclined orientation, relative to the seat section, for supporting a patient in an initial, seated position; and a generally horizontal orientation, relative to the seat section, for supporting a patient in a supine position.

Medical examination tables are typically located in an examination or operating room of a doctor's office other facility. Due to their size and weight, these examination tables are not frequently moved. When it is desired to move a table, however, this task is usually performed by personnel trained to move the tables. Conventional methods for moving a medical examination table involve lifting the table from the floor (usually requiring at least two persons) and placing the table on a dolly having a generally flat platform. The table is, lifted onto the dolly such that the base rests atop the platform of the dolly. This method, and the dollies typically used to move medical examination tables, present various drawbacks. For example, the conventional moving method requires at least two persons to lift the table and place it on a dolly. The method also poses a risk that the table may be dropped and damaged while it is lifted to place the base onto the dolly. A need therefore exists for a specialized cart and method of moving a medical examination table which overcomes these and other drawbacks of the prior art.

SUMMARY OF THE INVENTION

The present invention provides a transportation cart that is configured to facilitate relocating a medical examination table, and which permits this task to be performed by a single person. In one aspect of the invention, the transportation cart comprises a chassis having an open end that defines a receiving area for positioning a base of a medical examination table therebetween. A table support member extends upwardly from the chassis to engage structural portions of the examination table, such that the table may be supported thereon. After the cart has been positioned beneath a patient support section of the table, the table is actuated to move it toward the base. Ordinarily, this would mean lowering the table to, for example, allow a patient to be seated on the table. However, with the cart positioned beneath the table, just the reverse occurs, i.e., the base is raised rather than the table being lowered. With the table and base thus suspended above the floor, the cart can be maneuvered to move the table to a desired location.

In another aspect of the invention, the cart may be provided with straps or tethers that can be coupled to the structure of the examination table to thereby secure the table on the cart. The tethers include cam buckles to permit quick and easy adjustment of the tethers. The cart may further include structural features, such as apertures formed through gusset plates, to provide convenient locations for attaching additional straps, tethers, or other attachment members to secure the table to the cart or to secure the cart within a vehicle.

In another aspect of the invention, a method of moving a medical examination table includes adjusting a patient support section of the table to position the patient support section a first distance above the base of the table, locating a transportation cart adjacent the base and beneath the patient support section, adjusting the patient support section relative to the base to thereby engage the cart with the table, and further adjusting the patient support section to lift the base from the floor. The examination table may then be secured to the cart and the cart maneuvered to place the medical examination table at a new location. To remove the table from the cart, the base of the table is extended to engage the floor, and then further extended to raise the table from the cart.

The features and objectives of the present invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1A:
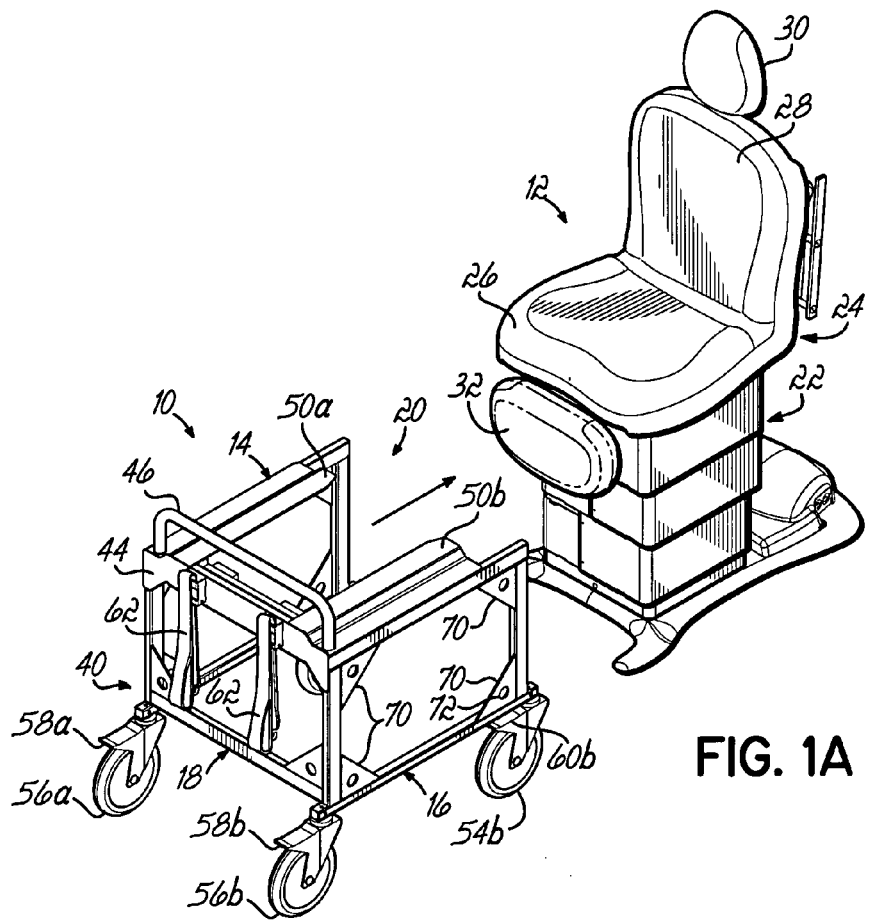
FIG. 1A is a perspective view of an exemplary transportation cart for moving a medical examination table, according to the present invention.

FIG. 1A depicts an exemplary transportation cart 10, according to the present invention. The cart 10 is configured to facilitate relocation of a medical examination table 12 in accordance with the method of the present invention. In the exemplary embodiment shown, the transportation cart 10 has a generally framework-type structure with first and second spaced sides 14, 16, and a third, or rear side 18 extending therebetween. The cart 10 has an open end 20 generally opposite the third side 18 to facilitate positioning the cart 10 beneath the patient support portion of an examination table 12. The cart 10 is provided with wheels or casters to facilitate positioning the cart 10 relative to the examination table 12, and to facilitate relocation of the table.

The examination table 12 includes a stationary base 22 which houses the various mechanisms and components of the table 12. A patient support 24, comprising a seat section 26 and a back section 28 is mounted atop the base 22 for supporting a patient thereon. The examination table may also be provided with a headrest 30 and a footrest 32. The back section 28 is moveable relative to the seat section 26 and the base 22 between a first, inclined orientation for supporting a patient in a seated position, and a second orientation wherein the back section 28 is substantially parallel to the seat section 26 to support a patient in a generally supine position, as known in the art. The seat and/or back sections 26, 28 are conventionally articulated between the various possible positions by an actuating mechanism (not shown) provided within the base 22 of the table 12. The actuating mechanism may include a motor, pneumatic or hydraulic cylinders, or other mechanisms suitable for articulating the back and/or seat sections 26, 28. The patient support 24 and base 22 are also vertically adjustable relative to one another such that the seat and back sections 26, 28 may be raised or lowered to various heights convenient for allowing patients to position themselves on the table 12, or to facilitate examination and/or the performance of medical procedures.

Figure 1B:
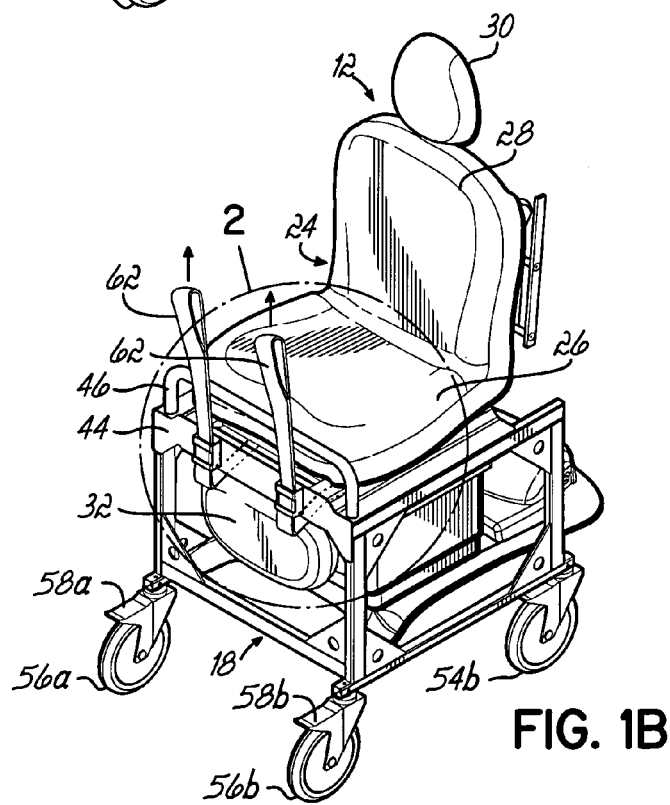
FIG. 1B is a perspective view depicting the transportation cart of FIG. 1A supporting the medical examination table.
Figure 3:
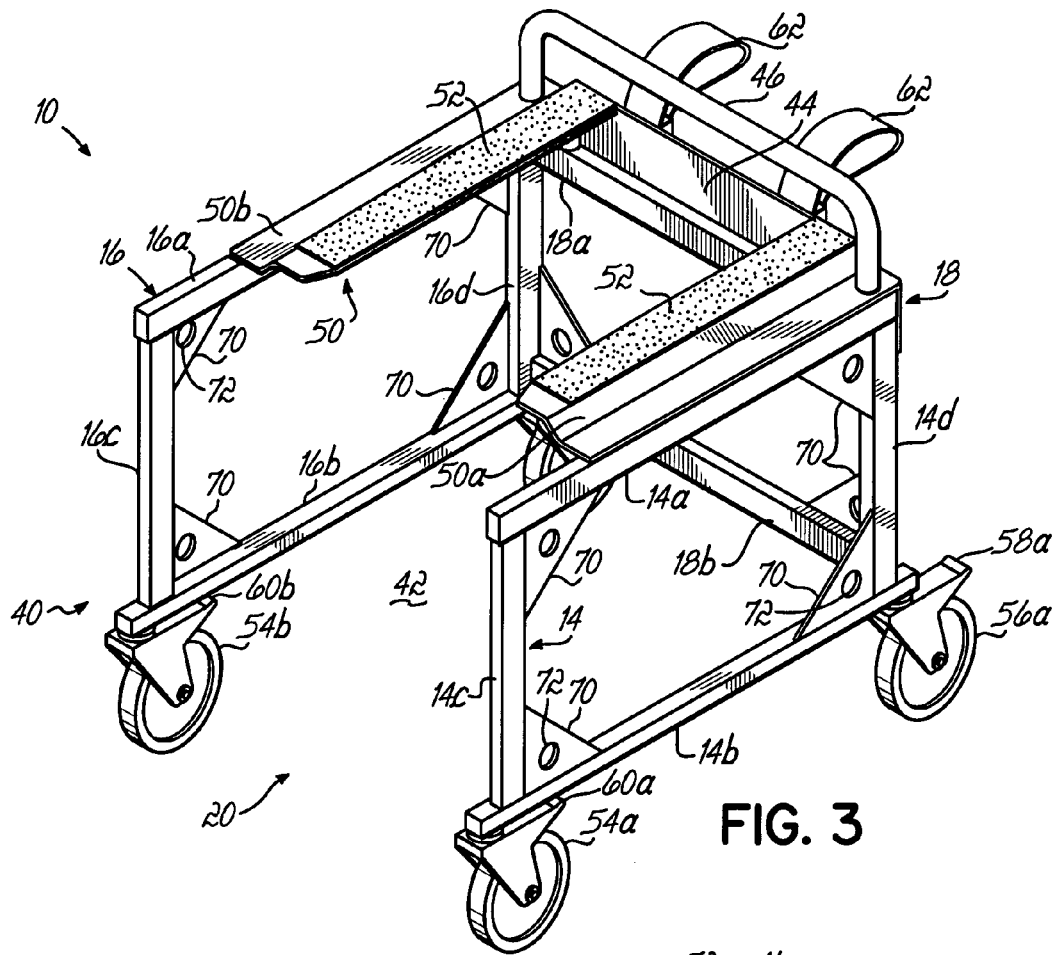
FIG. 3 is a perspective view of the cart of FIG. 1A.
Figure 4:
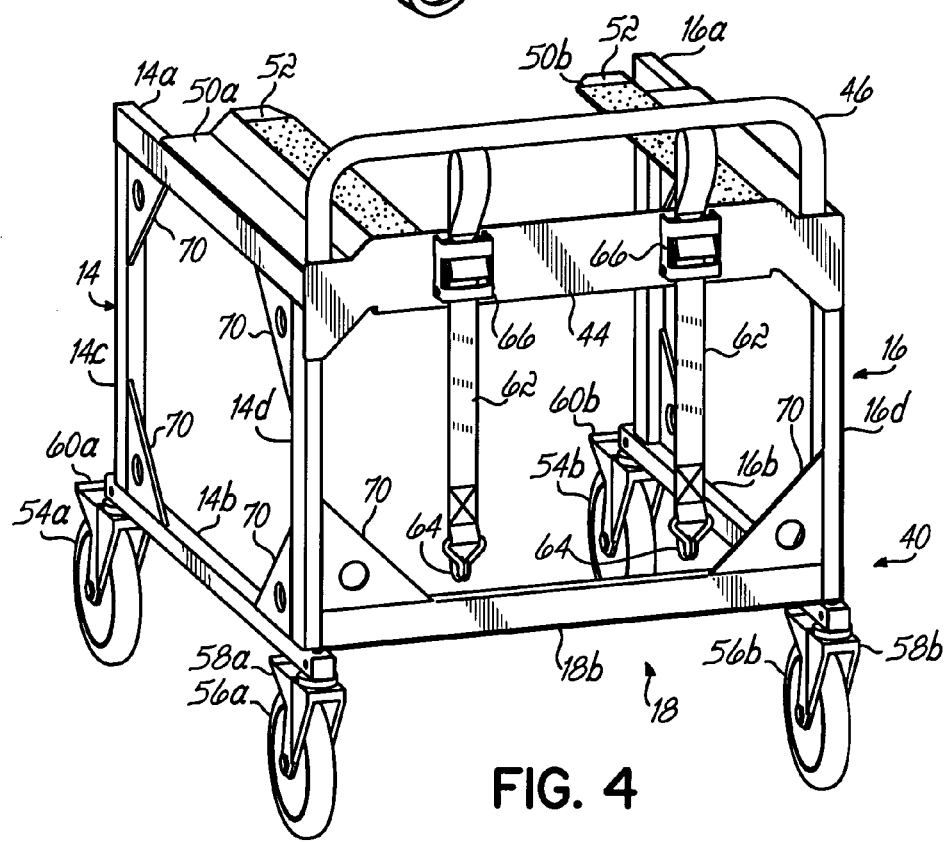
FIG. 4 is a perspective view of the cart of FIG. 3, viewed from the opposite end.

Referring now to FIGS. 3 and 4, the exemplary transportation cart 10 of FIGS. 1A and 1B is shown in more detail. The cart 10 includes a chassis 40 and first and second spaced, opposing sides 14, 16 extending upwardly from the chassis 40. A third side 18 extends upwardly from the chassis 40 and between the first and second sides 14, 16. The cart 10 has an open end 20 located generally opposite the third side 18 to permit the cart 10 to be positioned beneath the patient support of an examination table 10, with the base 22 positioned within a receiving area 42 defined by the first, second and third sides 14, 16, 18 of the cart 10, as shown in FIG. 1B. In the embodiment shown, the chassis 40 and sides 14, 16, 18 of the cart are constructed from generally elongate framing members connected end-to-end to form the frame-like structure. The first side 14 comprises spaced, horizontally extending, upper and lower framing members 14a, 14b and spaced, vertically extending, side framing members 14c, 14d joined in a generally rectangular arrangement. Similarly, the second side 16 comprises spaced, horizontally extending, upper and lower framing members 16a, 16b and spaced, vertically extending, side framing members 16c, 16d joined in a generally rectangular arrangement. The third side 18 comprises spaced, horizontally extending, upper and lower framing members 18a, 18b, each extending between respective side framing members 14d, 16d of the first and second sides 14, 16. The cart 10 may further include a cross plate 44 extending between the first and second sides 14, 16 and adjacent the upper framing member 18a of the third side 18.

While the framing members are shown as generally rectangular tubes or bars, it will be recognized that the framing members may comprise other shapes, such as round or hex shaped members, or may comprise plates or other structural elements. It will also be recognized that the chassis 40 and sides 14, 16, 18 of the cart 10 may be formed in various other ways to provide a sturdy support for transporting a medical examination table thereon.

The transportation cart 10 further includes a chair support member 50 extending above the chassis 40 a distance sufficient to engage the structural components of the examination table 12. In the embodiment shown, the chair support member 50 comprises first and second, elongate, angled brackets 50a, 50b secured to the top portions of the first and second sides 14, 16. The brackets 50a, 50b are formed from plates that have been bent into shapes which permit the cart 10 to engage the structure of the table 12 as the cart 10 is slid beneath the patient support 24. It will be recognized, however, that the table support members 50 may have other configurations, as may be desired, to facilitate engagement of the cart 10 with the structure of the table 12.

To protect the surfaces of the table structure which contact the cart 10, the table support members 50 may be configured to reduce or eliminate hard or abrasive surfaces which may scuff or otherwise wear corresponding surfaces of the examination table 12 that contact the cart 10. For example, the table support members 50 may be coated with a low friction or wear resisting paint or other material. In the embodiment shown, the upper surfaces of the table support members are provided with the loop-side portion 52 of a hook-and-loop fastener system (such as Velcro®) to protect to the finish of the examination table 12. This material also increases the amount friction between the table 12 and the table support member 50 to resist sliding of the table 12 while it is being moved by the cart 10. Other material such as cork, rubber, strips of carpet, or any other material suitable for protecting the surfaces of the examination table 10 may alternatively be used.

The transportation cart 10 has several casters 54a, 54b, 56a, 56b secured to the chassis 40 to facilitate positioning the cart 10 relative to an examination table 12, and to facilitate relocating a table 12 supported by the cart 10. In the embodiment shown, the cart 10 is provided with four casters, two casters 54a, 54b near the open end 20 of the cart 10, and two casters 56a, 56b near the third side 18. The two casters 56a, 56b positioned near the third side 18 of the cart 10 are brake casters which can be actuated to resist rolling movement of the wheels by depressing the levers 58a, 58b associated with those casters. The two casters 54a, 54b positioned near the open end 20 of the cart 10 are steering casters which can be locked in a desired angular steering position by depressing the corresponding levers 60a, 60b associated with those casters.

Figure 5A:
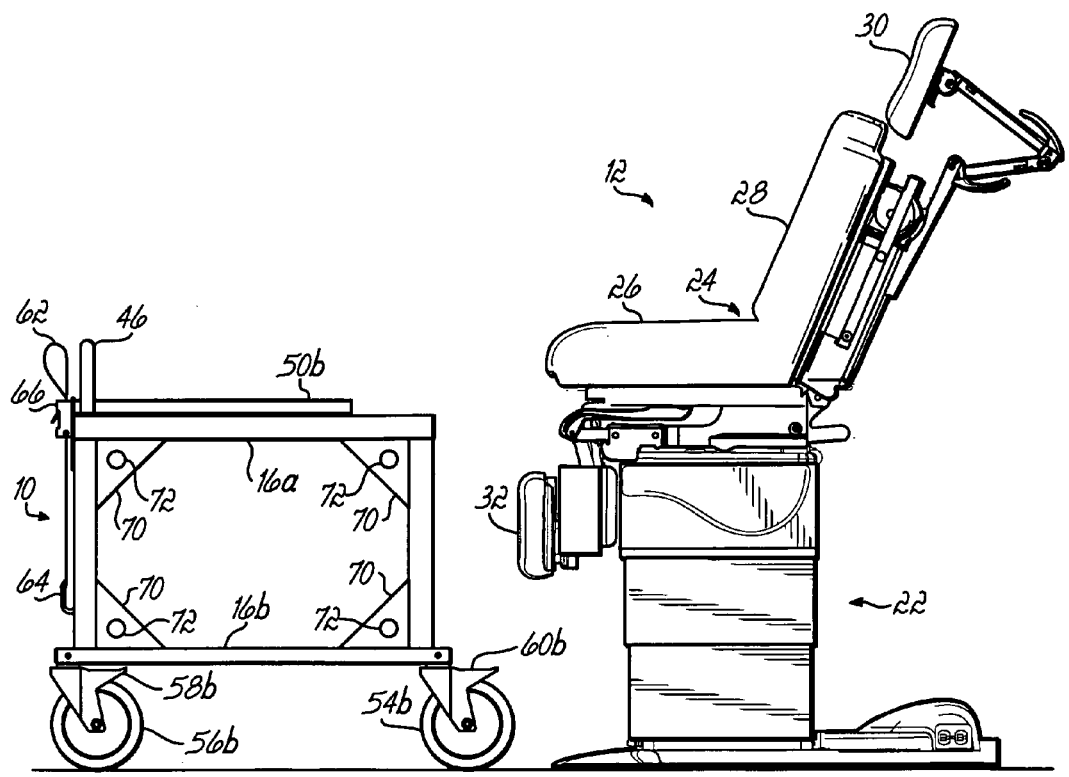
FIGS. 5A–5C are elevation views illustrating use of the cart to relocate a table.
Figure 5B:
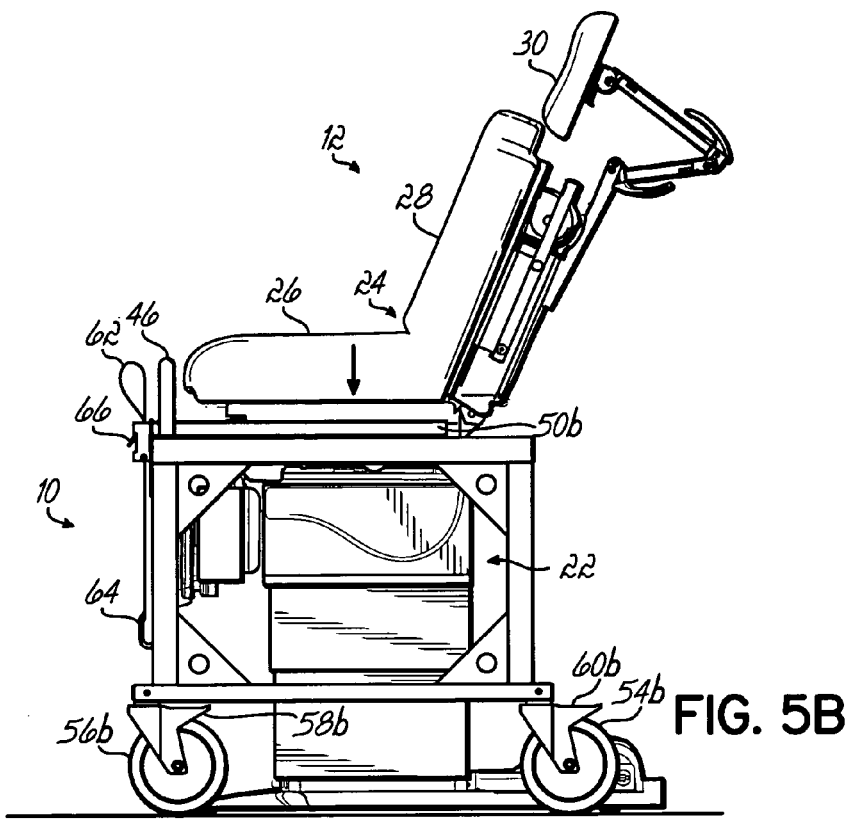

Referring now to FIGS. 1A, 1B and 5A–5C, use of the transportation cart 10 to relocate a medical examination table 12 will now be described. To relocate a medical examination table 12, the table is actuated to adjust the patient support 24 relative to the base 22, in a vertical direction, as depicted in FIG. 5A, so that the cart 10 may be maneuvered beneath the patient support 24. When the patient support 24 is at an appropriate height, the cart 10 is maneuvered to position the base 22 of the table 12 within the receiving area 44 of the cart 10 and the patient support members 50 are positioned beneath the seat 26 of the table 12, as depicted in FIGS. 1B and 5B.

Figure 5C:
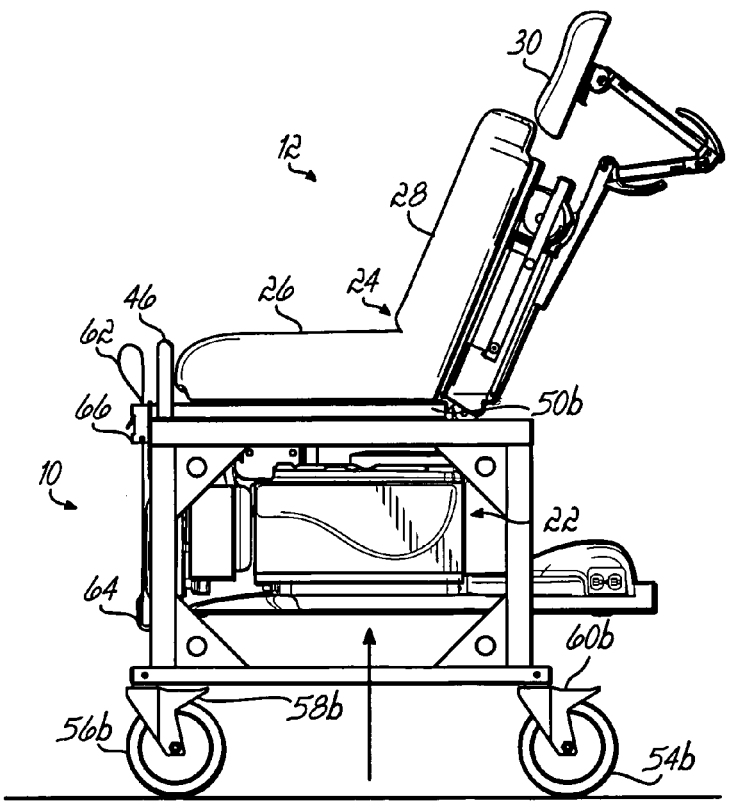

When the cart 10 is in the proper position, the examination table 12 is actuated to move the seat downward toward the base 22. After initial downward movement of the table 12, the structure beneath the seat 26 engages the cart 10. Further movement of the table toward the base 22 results in the base 22 being raised from the floor, as depicted in FIG. 5C. With the base 22 raised from the floor, the cart 10 may be maneuvered by rolling the cart 10 on its castors 54a, 54b, 56a, 56b to place the examination table 12 at a new location. The cart 10 may include a handrail 46 extending between the first and second sides 14, 16 to provide a convenient structure for grasping and guiding the cart 10.

Figure 2:
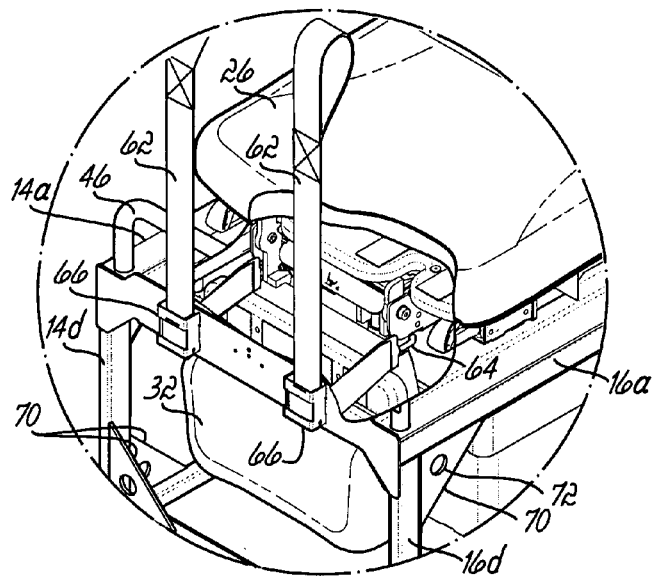
FIG. 2 is an enlarged perspective view of the encircled area of FIG. 1B, showing detail of the engagement between the cart and the table.

In the embodiment shown, the transportation cart 10 further includes tethers or straps 62 for securing the examination table 12 to the cart 10. The tethers 62 are fitted with hooks, clamps, or other fixtures 64 that may be attached to the table structure, as depicted in FIG. 2. The tethers 62 are mounted to the cart 10 by adjustable cam buckles 66 which permit selective adjustment of the lengths of the tethers 62. After the fixtures 64 have been secured to the table structure, the tethers 62 may be pulled tight, as depicted in FIGS. 1B and 2, to secure the table 12 to the cart 10. The cart 10 further includes gusset plates 70 extending between the elongated framing members 14a, 14b, 14c, 14d, 16a, 16b, 16c, 16d, 18a, 18b, to provide strength and rigidity to the cart structure. In the embodiment shown, apertures 72 are formed through the gusset plates 70. When a table 12 is being transported by the cart 10, additional tethers or straps may be secured between the table 12 and the apertures 72 formed in the gusset plates 70 to further ensure that the table 12 is secured to the cart 10. The apertures 72 also provide convenient locations for attaching tethers or straps between the cart 10 and structure on a vehicle in which the cart 10 may be transported, to secure the cart 10 in the vehicle.

When it is desired to place the table 12 at a new location, the process described above for placing the table 12 on the cart 10 may be reversed to place the table 12 on the floor surface at the new location. Specifically, the seat is raised relative to the base 22 until the base 22 engages the floor. Further upward movement of the table lifts it from the cart 10 after which, the cart 10 may be withdrawn from beneath the patient support section 24.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicant's general inventive concept.

What is claimed is:

1. A method of moving a medical examination table having a patient support section supported on a base and vertically adjustable relative to the base, the base resting on a floor, the method comprising:
   raising the patient support section relative to the base to position the patient support section a first distance above the base;
   locating a transportation cart adjacent the base and beneath the patient support section;
   lowering the patient support section relative to the base to position the patient support section a second distance relative to the base to thereby engage the cart with the table, the second distance being less than the first distance; and
   further lowering the patient support section relative to the base such that the base lifts from the floor and the table is supported on the cart.

2. The method of claim 1, further comprising securing the table to the cart.

3. The method of claim 2, wherein securing the table to the cart comprises connecting at least one tether between the cart and the table.

4. The method of claim 1, further comprising moving the cart to a new location while supporting the table thereon.

5. The method of claim 1, further comprising:
   raising the patient support section relative to the base;
   engaging the floor with the base;
   further raising the patient support section relative to the base to raise the table from the cart; and
   moving the cart from beneath the patient support section.

6. The method of claim 1, wherein the cart comprises:
   first and second spaced, opposing sides;
   a third side extending between said first and second sides, said first, second and third sides defining a receiving area therebetween, said receiving area sized to receive the base;
   an open end opposite said third side to facilitate maneuvering the cart relative to the table such that the base of the table is positioned within said receiving area; and
   a table support member coupled to at least one of said first, second, and third sides.

7. The method of claim 6, wherein said table support member extends into said receiving area.

8. In combination, a medical examination table and transportation cart, comprising:
   a transportation cart chassis having an open end defining a receiving area,
   a table support member extending above said chassis;
   a medical examination table patient support section removably supported on said table support member, and
   a base selectively vertically adjustable relative to said patient support section for movement in a first direction away from said patient support section to thereby engage a floor surface with said base and disengage said table from said table support member, and adjustable in a second direction toward said patient support section such that said base is raised from the floor surface and said medical examination table is supported on said table support member.

9. The apparatus of claim 8, wherein said transportation cart further comprises:
   first and second spaced, opposing sides extending upwardly from said chassis; and
   a third side extending upwardly from said chassis and between said first and second sides, said first, second, and third sides further defining said receiving area therebetween;
   said table support member coupled to at least one of said first, second, and third sides.

10. The apparatus of claim 9, wherein each of said first and second sides is formed from elongate framing members joined end to end.

11. The apparatus of claim 10, further comprising reinforcing gussets extending between adjacent framing members.

12. The apparatus of claim 9, wherein said table support member extends inwardly toward said receiving area.

13. The apparatus of claim 12, wherein said table support member comprises first and second brackets disposed on said first and second sides, respectively.

14. The apparatus of claim 8, further comprising a plurality of wheels disposed beneath said chassis.

* * * * *